United States Patent
Liu et al.

(10) Patent No.: US 12,495,330 B2
(45) Date of Patent: Dec. 9, 2025

(54) LOCAL EDGE OFFLOADING METHOD AND SYSTEM, AND OFFLOADING SERVICE APPARATUS AND BASE STATION

(71) Applicant: ZTE CORPORATION, Guangdong (CN)

(72) Inventors: Ling Liu, Guangdong (CN); Jialin Peng, Guangdong (CN); Wenyi Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 291 days.

(21) Appl. No.: 18/274,735

(22) PCT Filed: Jan. 7, 2022

(86) PCT No.: PCT/CN2022/070642
§ 371 (c)(1),
(2) Date: Jul. 28, 2023

(87) PCT Pub. No.: WO2022/183844
PCT Pub. Date: Sep. 9, 2022

(65) Prior Publication Data
US 2024/0022962 A1    Jan. 18, 2024

(30) Foreign Application Priority Data

Mar. 1, 2021  (CN) .......................... 202110225288.2

(51) Int. Cl.
*H04W 76/18*    (2018.01)
*H04W 28/088*   (2023.01)

(52) U.S. Cl.
CPC ......... *H04W 28/088* (2023.05); *H04W 76/18* (2018.02)

(58) Field of Classification Search
CPC .................................................. H04W 28/088
See application file for complete search history.

(56) References Cited

U.S. PATENT DOCUMENTS

| | | | |
|---|---|---|---|
| 2014/0328182 A1* | 11/2014 | Gao | ...................... H04W 76/15 370/236 |
| 2020/0245182 A1* | 7/2020 | Chitta | ................. H04L 61/2591 |

FOREIGN PATENT DOCUMENTS

| | | |
|---|---|---|
| CN | 106941733 A | 7/2017 |
| CN | 109951880 A | 6/2019 |

(Continued)

OTHER PUBLICATIONS

Extended Search Report in Corresponding European Application No. 22762313.9, dated Jul. 11, 2024; 14 pgs.

(Continued)

*Primary Examiner* — Pamit Kaur
(74) *Attorney, Agent, or Firm* — HAUPTMAN HAM, LLP

(57) ABSTRACT

Embodiments of the present disclosure provide a local edge offloading method and system, and an offloading service apparatus and a base station. The local edge offloading method includes: an offloading service receiving user plane bearer information sent from a base station, and establishing an offloading user plane instance according to the user plane bearer information; upon reception of an uplink data service package sent from the base station, the offloading service determining whether there is a corresponding offloading user plane instance for the uplink data service package; and in a case where there is a corresponding offloading user plane instance in the uplink data service package, matching the uplink data service package with an offloading matching rule, and determining to forward the uplink data service package to a core network or a local server.

20 Claims, 6 Drawing Sheets

(56) References Cited

FOREIGN PATENT DOCUMENTS

| | | |
|---|---|---|
| CN | 112020873 A | 12/2020 |
| EP | 2843885 A1 | 3/2015 |
| WO | 2018045515 A1 | 3/2018 |

OTHER PUBLICATIONS

International Search Report and Written Opinion in Corresponding International Application No. PCT/CN2022/070642, mailed Mar. 28, 2022; 12 pgs.

* cited by examiner

LOCAL EDGE OFFLOADING METHOD AND SYSTEM, AND OFFLOADING SERVICE APPARATUS AND BASE STATION

CROSS-REFERENCE TO RELATED APPLICATIONS

This application is a national phase application of the international application PCT/CN2022/070642 filed on Jan. 7, 2022, under 35 U.S.C. § 371, and claims the priority of Chinese patent application CN 202110225288.2, entitled "Local Edge Offloading Method and System, and Offloading Service Apparatus and Base Station" and filed on Mar. 1, 2021, the entirety of which is incorporated herein by reference.

FIELD OF THE INVENTION

Embodiments of the present disclosure relate to, but are not limited to, the technical field of wireless communications, and in particular relate to, but are not limited to, a local edge offloading method, a local edge offloading system, an offloading service apparatus, and a base station.

BACKGROUND OF THE INVENTION

At present, 5G technology is booming, and will be mainly applied in industry applications in the future, in particular more urgent and important in toB industry applications.

When 5G wireless technology is applied to the toB industry applications, the basic requirements on the wireless network are required for the industry applications as follows.
(1) Data does not leave a zone, so as to guarantee security of the data.
(2) Delay is reduced as much as possible, and deterministic delay for some services is required.

Based on the above requirements, a local edge offloading function becomes a basic function for the toB industry. In order to realize the local edge offloading, a UPF sink solution is generally adopted currently. However, during the implementation of the UPF sink solution, the following problems exist.
(1) Deployment costs are high, since independent hardware is required for the deployment of the UPF. The deployment of the independent hardware in a machine room relates to processes, such as, for applying for rack resources, positions, optical fiber resources, and the approval for the processes is tedious.
(2) Applying for a lot of transmission interfacing resources is required; and fulfilling a service relates to many fields, such as, a core network and transmission, resulting in high complexity of service activation.
(3) A UPF from other manufacturers cannot interface with a 5GC when the UPF from the other manufacturers is deployed, since the UPF and the 5GC are not decoupled.

SUMMARY OF THE INVENTION

Embodiments of the present disclosure provides a local edge offloading method, a local edge offloading system, an offloading service apparatus, and a base station. This solution is simple, does not need a tedious resource approval process, and involves fewer aspects during fulfilling a service, thereby realizing quick deployment of fulfilling a service while effectively reducing costs, so as to better satisfy service needs of a user in the toB industry.

An embodiment of the present disclosure provides a local edge offloading method, and the method includes: receiving, by an offloading service, user plane bearer information sent from a base station, and establishing an offloading user plane instance according to the user plane bearer information; determining, by the offloading service, upon reception of an uplink data service package sent from the base station, whether there is an offloading user plane instance corresponding to the uplink data service package; and in a case where there is an offloading user plane instance corresponding to the uplink data service package, matching the uplink data service package with an offloading matching rule, and determining to forward the uplink data service package to a core network or a local server.

An embodiment of the present disclosure further provides a local edge offloading method, and the method includes: establishing, by a base station, a user plane instance for a user terminal which accesses the base station, and sending user plane bearer information of the user plane instance to an offloading service, the user plane bearer information being used for establishing an offloading user plane instance by the offloading service; and generating, by the base station, upon reception of an uplink data service sent from the user terminal, an uplink data service package and sending the uplink data service package to the offloading service, and determining, by the offloading service, to forward the uplink data service package to a core network or a local server according to an offloading matching rule.

An embodiment of the present disclosure further provides an offloading service apparatus, and the apparatus includes: a bearer information processing module, a tunnel encapsulation/de-encapsulation module, a rule matching module, and a package forwarding module, wherein the bearer information processing module is configured to receive user plane bearer information sent from a base station, to establish an offloading user plane instance according to the user plane bearer information, and to record a correspondence relationship between a user terminal in the user plane bearer information and a GTP-U tunnel; the tunnel encapsulation/de-encapsulation module is configured to perform tunnel de-encapsulation in a case where an uplink data package is received, and to perform tunnel encapsulation in a case where a downlink data package is received; the rule matching module is configured to receive an uplink data service package sent from the base station, to determine whether there is a corresponding offloading user plane instance in the uplink data service package, and to match the uplink data service package to an offloading matching rule in a case where there is a corresponding offloading user plane instance in the uplink data service package and to determine to forward the uplink data service package to a core network or a local server; and the package forwarding module is configured to forward the uplink data service package to the local server or the core network.

An embodiment of the present disclosure further provides a base station, and the base station includes: a control plane processing module, a user plane processing module, and the above offloading service apparatus, wherein the control plane processing module is configured to connect to a user terminal, and to exchange data with the user plane processing module; and the user plane processing module is configured to establish a user plane instance for the user terminal, and to send user plane bearer information to the offloading service apparatus.

An embodiment of the present disclosure further provides a local edge offloading system, and the system includes: user terminal, a local server, a core network, and the above base station, wherein the base station establishes a corresponding user plane instance and an offloading user plane instance for the user terminal which is connected to the base station; in a case where an uplink data service package sent from the user terminal is received, the offloading user plane instance determines whether there is a corresponding local offloading user plane instance for the uplink data service package; and in a case where there is a corresponding local offloading user plane instance for the uplink data service package, the uplink data service package is matched with an offloading matching rule, and forwarding the uplink data service package to the core network or the local server is determined.

BRIEF DESCRIPTION OF THE DRAWINGS

The present disclosure will be further described below with reference to the accompanying drawings and embodiments. In the drawings.

DETAILED DESCRIPTION OF THE EMBODIMENTS

In order to make the objective, technical solutions, and advantages of the present disclosure clearer, embodiments of the present disclosure are further described in detail by specific implementations with reference to accompanying drawings. It should be understood that, specific embodiments described herein are used only for explaining the present disclosure, and are not used for limiting the present disclosure.

Embodiment One

A UPF sinking solution adopted for a current toB service has the problems as follows: deployment costs are high since independent hardware is required for the deployment of the UPF; applying for a lot of transmission interfacing resources is required, and fulfilling a service relates to many fields, such as, a core network and transmission, resulting in high complexity of service activation; and a UPF from other manufacturers cannot interface with a 5GC when the UPF from the other manufacturers is deployed, since the UPF and the 5GC are not decoupled. In order to solve the above problems, the present embodiment provides a local edge offloading method.

Figure 1:
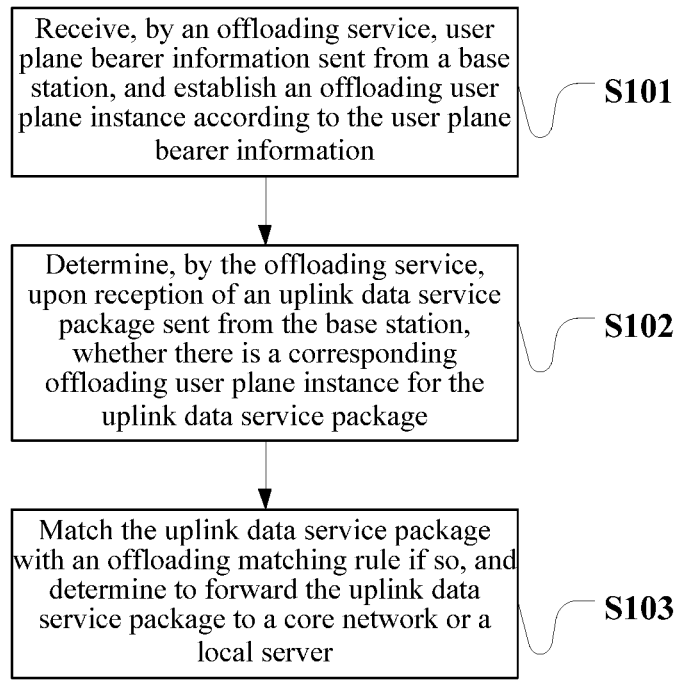
FIG. 1 is a flowchart of a local edge offloading method on an offloading service side provided in Embodiment One of the present disclosure.

Steps of a local edge offloading method provided in the present embodiment are illustrated in FIG. 1. FIG. 1 schematically illustrates a flowchart of a local edge offloading method on an offloading service apparatus side, and the method includes the following steps S101 to S103.

At step S101, an offloading service receives user plane bearer information sent from a base station, and establishes an offloading user plane instance according to the user plane bearer information.

The local edge offloading method provided in the present embodiment is deployed in the toB service, and thus base stations mentioned herein refer to base stations deployed in the toB service. These base stations refer to base stations deployed in a specified scope, and working parameters of a base station may be adjusted to be suitable for the local edge offloading method provided in the present embodiment. When a user terminal accesses a base station, a user plane of the base station may establish a corresponding user plane instance for the user, and the user plane instance contains bearer information of the user plane. An offloading user plane instance corresponding to the user terminal may be established by receiving user plane bearer information of the base station.

At step S102, upon reception of an uplink data service package sent from the base station, the offloading service determines whether there is an offloading user plane instance corresponding to the uplink data service package.

In the local edge offloading method provided in the present embodiment, the base station sends an uplink data service received from the user terminal to the offloading service, and the offloading service determines whether the uplink data service accesses a core network or a local server. When the uplink data service package sent from the base station is received, it is determined whether there is a corresponding offloading user plane instance for the user terminal, so as to accurately process and forward the data service package.

At step S103, if the offloading service determines there is an offloading user plane instance corresponding to the uplink data service package, the uplink data service package is matched with an offloading matching rule, and forwarding the uplink data service package to a core network or a local server is determined.

When the uplink data service package from the base station is received and a corresponding offloading user plane instance is found locally, offloading processing may be performed on the uplink data service package. By matching the uplink data service package with the offloading matching rule, forwarding the uplink data service package to the local server or to the core network is determined according to a matching relationship. It should be noted that, in actual applications, the offloading matching rule may be set flexibly as required.

In some other embodiments, a GTP-U tunnel is used for data transmission between the offloading service and the base station as well as between the offloading service and the core internet. When the offloading service receives the user plane bearer information, the method further includes: recording a correspondence relationship between the user terminal in the user plane bearer information and the GTP-U tunnel.

In the existing deployment, the base station is directly connected to the core network. In the local edge offloading method provided in the present embodiment, the base station is connected to the offloading service, and the offloading service in turn is connected to the core network and the local server. A data path between the base station and the offloading service is selected in the present disclosure. The GTP-U tunnel for transmission is used as the data path between the offloading service and the core network. When the offloading service has received the user plane bearer information and establishes the offloading user plane instance, the correspondence relationship between the user terminal in the user plane bearer information and the GTP-U tunnel is further recorded by the offloading service.

In some other embodiments, when the offloading service has received a downlink data service package sent from the local server, the offloading service matches the downlink data service package with the offloading matching rule and determines whether to forward the downlink data service package to a corresponding base station.

The local server generates the downlink data service package when the local server needs to perform a data service exchange. When the offloading service has received the downlink data service package sent from the local server, the offloading service needs to match the downlink data service package with the offloading matching rule and determines whether to forward the downlink data service package to the corresponding base station.

In some other embodiments, establishing the offloading user plane instance according to the user plane bearer information includes: performing tunnel de-encapsulation on the user plane bearer information, and establishing the offloading user plane instance. The offloading user plane instance has two primary keys including tunnel information on a base station side and tunnel information on a core network side.

Since the user plane bearer information is transmitted through the GTP-U tunnel, it is necessary to perform the tunnel de-encapsulation when the user plane carrying information has received, and the de-encapsulated user plane bearer information is used to establish the offloading user plane instance. The established offloading user plane instance needs to receive information sent from the base station side and to send information to the core network side. Thus, the offloading user plane instance has two primary keys including the tunnel information on the base station side and the tunnel information on the core network side.

In some other embodiments, matching the uplink data service package with the offloading matching rule and determining to forward the uplink data service package to the core network or the local server include: forwarding the uplink data service package to the local server when the uplink data service package is matched with the offloading matching rule, and forwarding the uplink data service package to the core network when the uplink data service package is not matched with the offloading matching rule.

In some other embodiments, when the offloading service has received new user plane bearer information, the offloading service queries whether there is a corresponding offloading user plane instance; if there is a corresponding offloading user plane instance, the offloading user plane instance is updated; and if there is no corresponding offloading user plane instance, a new offloading user plane instance is established.

The user plane instance needs to be updated when the user plane information of the user terminal which accesses the base station, or a new user plane instance is established when a new user terminal accesses, and the user plane bearer information sent from the base station to the offloading service changes correspondingly. Thus, when the user plane bearer information received by the offloading service changes, whether there is an offloading user plane instance corresponding to the user plane bearer information changed is queried locally firstly. If there is a corresponding offloading user plane instance, information in the offloading user plane instance is updated; and if there is no corresponding offloading user plane instance, a new offloading user plane instance is established.

In some other embodiments, when the offloading service receives releasing bearer information, the offloading service looks up and deletes a corresponding offloading user plane instance.

When the base station deletes a user plane instance of a certain user terminal, releasing bearer information is generated to notify the offloading service to delete a corresponding offloading user plane instance.

In some other embodiments, when the offloading service finds out no corresponding offloading user plane instance according to the uplink data service package, the offloading service sends a bearer information request to the corresponding base station; and the offloading service receives the user plane bearer information sent from the base station, and establishes a new offloading user plane instance.

The offloading service receives the uplink data service package sent from the base station. When the offloading service cannot find out a corresponding offloading user plane instance, the offloading service needs to send a bearer information request to the base station to request for corresponding user plane bearer information from the base station, and establishes a new offloading user plane instance after receiving the user plane bearer information sent from the base station.

In some other embodiments, when the number of base stations to which the offloading service is connected is greater than or equal to two, an outer layer tunnel is encapsulated on a GTP-U package between the base station and the offloading service, and the outer layer tunnel is a two-layer tunnel or a three-layer tunnel.

In consideration of that the number of base stations deployed in the toB service may be greater than or equal to two, it is necessary to enable data transmission among or between the base stations and data transmission between respective base stations and the offloading service. Therefore, for the tunnel between the base station and the offloading service, the outer layer tunnel may be encapsulated on the GTP-U package, and the outer layer tunnel is a two-layer tunnel or a three-layer tunnel. In this way, it is convenient to send an offloading package of the base station to the offloading service without changing a transmission network.

In some other embodiments, when the offloading service has received a switching instruction sent from the base station, the offloading service marks a corresponding offloading user plane instance according to the switching instruction, and the switching instruction is generated when the user terminal switches among base stations. When there is a switching mark on the offloading user plane instance corresponding to the user plane bearer information, the offloading user plane instance is updated.

When the user terminal moves, the base station to which the user terminal accesses is switched among multiple base stations, and when the base station to which the user terminal is connected is switched, a source base station to which the user terminal is connected originally generates a switching instruction. When the offloading service receives the switching instruction, the offloading service marks a corresponding offloading user plane instance according to the switching instruction. When the base station to which the user terminal is connected is switched, a reverse transmission tunnel is established between a target base station to which the user terminal is currently connected and the source base station. The source base station sends the user plane bearer information corresponding to the user terminal to the target base station, and the target base station establishes a new user plane instance at a user plane and sends the user plane bearer information in the new user plane instance to the offloading service. When the offloading service has received the user plane bearer information, the offloading service looks up a corresponding offloading user plane instance. If the offloading user plane instance has a switching mark, the offloading user plane instance is switched and updated.

In some other embodiments, the offloading matching rule includes, but is not limited to, at least one matching rule from: quintuplet offloading, slice offloading, PLMN offloading, and domain name offloading.

In some other embodiments, the user plane bearer information includes, but is not limited to, at least one kind of information from: tunnel information on a base station side, tunnel information of a user plane of the core network, PLMN information, slice information, and Qos information.

The present embodiment provides a local edge offloading method, and the method includes: an offloading service receiving user plane bearer information sent from a base station, and establishing an offloading user plane instance according to the user plane bearer information; upon reception of an uplink data service package sent from the base station, the offloading service determining whether there is a corresponding offloading user plane instance for the uplink data service package; and if so, matching the uplink data service package with an offloading matching rule, and determining to forward the uplink data service package to a core network or a local server. By disposing an offloading service apparatus in an existing network, connecting the base station to the offloading service apparatus, establishing an offloading user plane instance by the offloading service apparatus, and performing offloading matching on an uplink data package service according to the offloading matching rule, local edge data service offloading is realized in some implementations, thereby reducing deployment costs and degree of difficulty, reducing a scope of influence, and achieving quick deployment of fulfilling a service.

Embodiment Two

Figure 2:
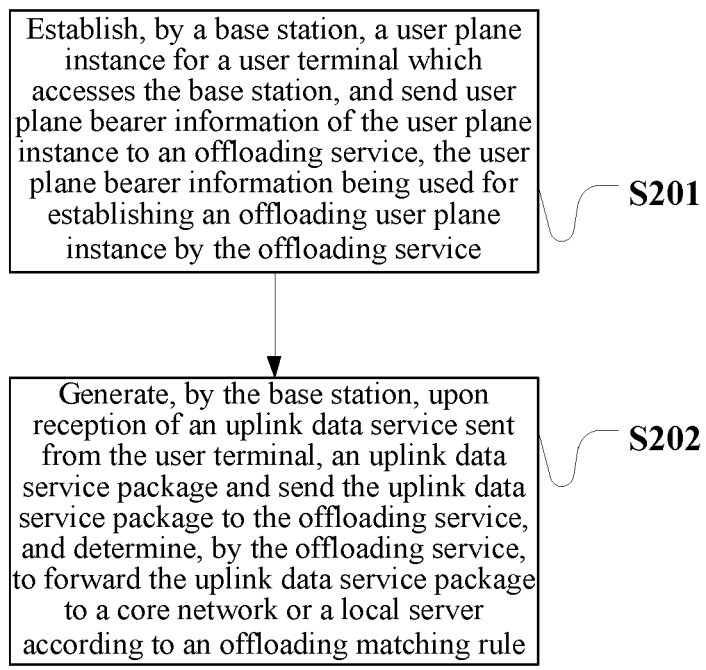
FIG. 2 is a flowchart of a local edge offloading method on a base station side provided in Embodiment Two of the present disclosure.

The present embodiment further provides a local edge offloading method, and the local edge offloading method is implemented on a base station side. The schematic flowchart is illustrated in FIG. 2, and the method includes the following steps S201 and S202.

At step S201, a base station establishes a user plane instance for a user terminal which accesses the base station, and sends user plane bearer information of the user plane instance to an offloading service. The user plane bearer information is used for establishing an offloading user plane instance by the offloading service.

The local edge offloading method provided in the present embodiment is deployed in a toB service, and is realized by using base stations originally deployed in the toB service. Working parameters of these base stations may be adjusted to be suitable for the local edge offloading method provided in the present embodiment. When a user terminal accesses a base station, a user plane of the base station establishes a corresponding user plane instance for a user, and the user plane instance contains bearer information of the user plane. An offloading service may establish an offloading user plane instance corresponding to the user terminal by receiving the user plane bearer information of the base station.

At step S202, upon reception of an uplink data service sent from the user terminal, the base station generates an uplink data service package and sends the uplink data service package to the offloading service. The offloading service determines to forward the uplink data service package to a core network or a local server according to an offloading matching rule.

In the local edge offloading method provided in the present embodiment, the base station sends the uplink data service received from the user terminal to the offloading service, and the offloading service determines whether the uplink data service accesses the core network or the local server. When the uplink data service package sent from the base station is received, it is determined whether there is a corresponding offloading user plane instance for the user terminal, so that the offloading service may accurately process and forward the data service package.

In some other embodiments, a GTP-U tunnel is used for data transmission between the base station and the offloading service.

The GTP-U tunnel may be used to transmit the user plane bearer information between the base station and the offloading service, and may also be used to transmit a package of a user plane, uplink and downlink data service packages, and the like.

In some other embodiments, when the base station receives a downlink data service package sent from the offloading service, the base station sends the downlink data service package to a corresponding user terminal.

When the base station receives the downlink data service package sent from the offloading service, the base station sends the downlink data service package to the corresponding user terminal.

In some other embodiments, when the user plane bearer information changes, the changed user plane bearer information is sent to the offloading service.

When the user plane bearer information in the user plane instance on the base station changes, it is necessary to send the changed user plane bearer information to the offloading information, so as to make the offloading service update the offloading user plane instance in time.

In some other embodiments, when the user plane instance is deleted, releasing bearer information is sent to the offloading service.

When the user plane instance on the base station is deleted, it is necessary to send the releasing bearer information to the offloading service, so as to notify the offloading service to delete the corresponding offloading user plane instance in time.

In some other embodiments, when a bearer information request sent from the offloading service is received, corresponding user plane bearer information is looked up and sent to the offloading service.

In some other embodiments, when the number of base stations is greater than or equal to two, an outer layer tunnel is encapsulated on a GTP-U package between the base station and the offloading service, and the outer layer tunnel is a two-layer tunnel or a three-layer tunnel.

In consideration of that the number of base stations deployed in the toB service may be greater than or equal to two, it is necessary to enable data transmission among or between the base stations and data transmission between respective base stations and the offloading service. Therefore, for the tunnel between the base station and the offloading service, an outer layer tunnel may be encapsulated on a GTP-U package, and the outer layer tunnel is a two-layer tunnel or a three-layer tunnel. In this way, it is convenient to send an offloading package of the base station to the offloading service without changing a transmission network.

In some other embodiments, when the base station which the user terminal accesses is switched from a source base station to a target base station, the source base station generates a switching instruction and sends the switching instruction to the offloading service. A reverse transmission tunnel is established between the source base station and the target base station. The source base station sends source user plane bearer information of the user terminal to the target base station, and the target base station establishes a destination user plane instance and sends destination user plane bearer information to the offloading service. The destination user plane bearer information is used by the offloading service to switch and update a corresponding offloading user plane instance.

When the user terminal moves, the base station to which the user terminal accesses may be switched among multiple base stations, and when the base station to which the user terminal is connected is switched, a source base station to which the user terminal is connected originally generates a switching instruction. When the offloading service receives the switching instruction, the offloading service marks a corresponding offloading user plane instance according to the switching instruction. When the base station to which the user terminal is connected is switched, a reverse transmission tunnel is established between a target base station to which the user terminal is currently connected and the source base station. The source base station sends user plane bearer information corresponding to the user terminal to the target base station, and the target base station establishes a new user plane instance at a user plane and sends user plane bearer information in the new user plane instance to an offloading service apparatus. When the offloading service apparatus receives the user plane bearer information, the offloading service apparatus looks up a corresponding offloading user plane instance. If the offloading user plane instance has a switching mark, the offloading user plane instance is switched and updated.

In some other embodiments, the offloading matching rule includes, but is not limited to, at least one matching rule from: quintuplet offloading, slice offloading, PLMN offloading, and domain name offloading.

In some other embodiments, the user plane bearer information includes, but is not limited to, at least one kind of information from: tunnel information on a base station side, tunnel information of a user plane of the core network, PLMN information, slice information, and Qos information.

The present embodiment provides a local edge offloading method, and the method includes: a base station establishing a user plane instance for a user terminal which accesses the base station and sending user plane bearer information of the user plane instance to an offloading service, the user plane bearer information being used for establishing an offloading user plane instance by the offloading service; and upon reception of an uplink data service sent from the user terminal, the base station generating an uplink data service package and sending the uplink data service package to the offloading service, the offloading service determining to forward the uplink data service package to a core network or a local server according to an offloading matching rule. By disposing an offloading service apparatus in an existing network, connecting the base station to the offloading service apparatus, establishing an offloading user plane instance by the offloading service apparatus, and performing offloading matching on an uplink data package service according to the offloading matching rule, local edge data service offloading is realized in some implementations, thereby reducing deployment costs and degree of difficulty, reducing a scope of influence, and achieving quick deployment of fulfilling a service.

Embodiment Three

Figure 3:
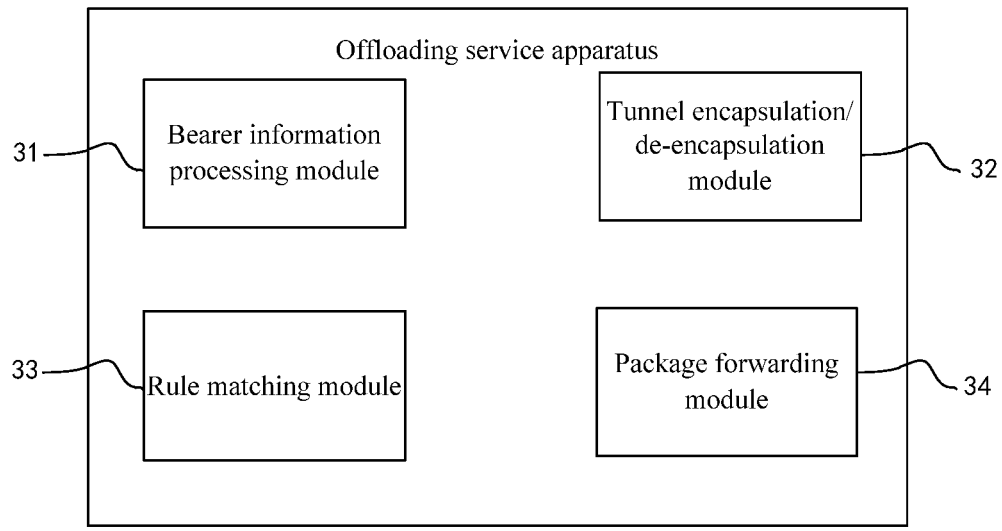
FIG. 3 is a schematic diagram of a structure of an offloading service apparatus provided in Embodiment Three of the present disclosure.

The present embodiment provides an offloading service apparatus, and a structure of the offloading service apparatus is shown in FIG. 3. The offloading service apparatus includes: a bearer information processing module 31, a tunnel encapsulation/de-encapsulation module 32, a rule matching module 33, and a package forwarding module 34. The bearer information processing module 31 is configured to receive user plane bearer information sent from a base station, to establish an offloading user plane instance according to the user plane bearer information, and to record a correspondence relationship between a user terminal in the user plane bearer information and a GTP-U tunnel. The tunnel encapsulation/de-encapsulation module 32 is configured to perform tunnel de-encapsulation when an uplink data package is received, and to perform tunnel encapsulation when a downlink data package is received. The rule matching module 33 is configured to receive an uplink data service package sent from the base station, to determine whether there is an offloading user plane instance corresponding to the uplink data service package, and to match the uplink data service package to an offloading matching rule if there is an offloading user plane instance corresponding to the uplink data service package and to determine to forward the uplink data service package to a core network or a local server. The package forwarding module 34 is configured to forward the uplink data service package to the local server or the core network.

In another embodiment, the package forwarding module 34 is further configured to receive a downlink data service package sent from the local server. The rule matching module 33 is further configured to match the downlink data service package with the offloading matching rule, and to determine whether to forward the downlink data service package to the corresponding base station.

The function of the bearer information processing module in the offloading service apparatus shown in FIG. 3 is described as follows: a user plane package between the base station and the core network is a GTP-U package, and a bearer link is established between the base station and the core network; and in order to establish a quick uplink and downlink path between the user terminal and a local service without changing an existing processing manner of the base station, the offloading service apparatus needs to acquire user plane bearer information, establish an offloading user plane instance according to the bearer information, and record a relationship with the user terminal. The function of the tunnel encapsulation/de-encapsulation module for a package is described as follows: a tunnel includes a GTP-U tunnel and other outer layer tunnels; an offloading service receives an uplink user plane package, and needs to perform tunnel de-encapsulation processing on the package; an interior package obtained after de-encapsulation is performed may be an IP package or an Ethernet-only package; when the package is de-encapsulated, it is necessary to record a correspondence relationship between an UE and the tunnel, so that tunnel encapsulation may be performed on a downlink package normally; for the downlink package, a corresponding tunnel is looked up for performing encapsulation according to UE information. The function of the rule processing module is described as follows: configured rule types may include offloading manners, such as quintuplet (a source IP, a source port, a protocol, a destination IP, and a destination port) offloading, slice offloading, PLMN offloading, and domain name offloading; combination of multiple offloading rules is also supported, for example, some stations adopt the slice offloading and some stations adopt the quintuplet offloading; for an uplink package, whether the uplink package matches a matching rule is determined based on package contents; the uplink package is forwarded locally if the uplink package matches the matching rule, and otherwise the uplink package is forwarded to the core network; and for a downlink package of a local network, it is necessary to determine whether the downlink package meets a corresponding rule, and the downlink package is sent to the base station if the downlink package meets the corresponding rule. The function of the package forwarding module is described as follows: the package forwarding module is configured to forward different service package to different local networks through different local logical ports.

In the present embodiment, the offloading service needs to acquire the user plane bearer information, so as to accurately forward a package and perform GTP-U tunnel encapsulation on the package, and the user plane bearer information is not reported by a control plane. The user plane bearer information in the present embodiment is reported by being encapsulated in a corresponding GTP-U tunnel of a user, which is more timely and effective.

Figure 4:
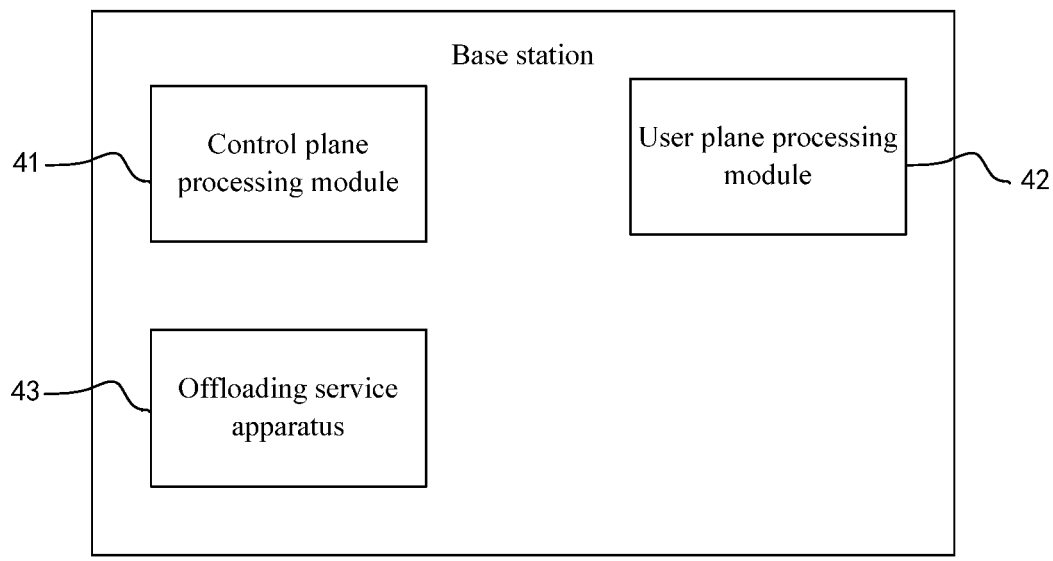
FIG. 4 is a schematic diagram of a structure of a base station provided in Embodiment Three of the present disclosure.

The present embodiment further provides a base station, and a structure of the base station is shown in FIG. 4. The base station includes: a control plane processing module 41, a user plane processing module 42, and the above offloading service apparatus 43. The control plane processing module 41 is configured to connect to a user terminal, and to exchange data with the user plane processing module 42. The user plane processing module 42 is configured to establish a user plane instance for the user terminal, and to send the user plane bearer information to the offloading service apparatus 43.

It should be noted that, in the present embodiment, the offloading service apparatus may be directly integrated in the base station and is deployed together with the base station when the offloading service apparatus is mounted, and alternatively the offloading service apparatus may be deployed as a separate apparatus.

Figure 5:
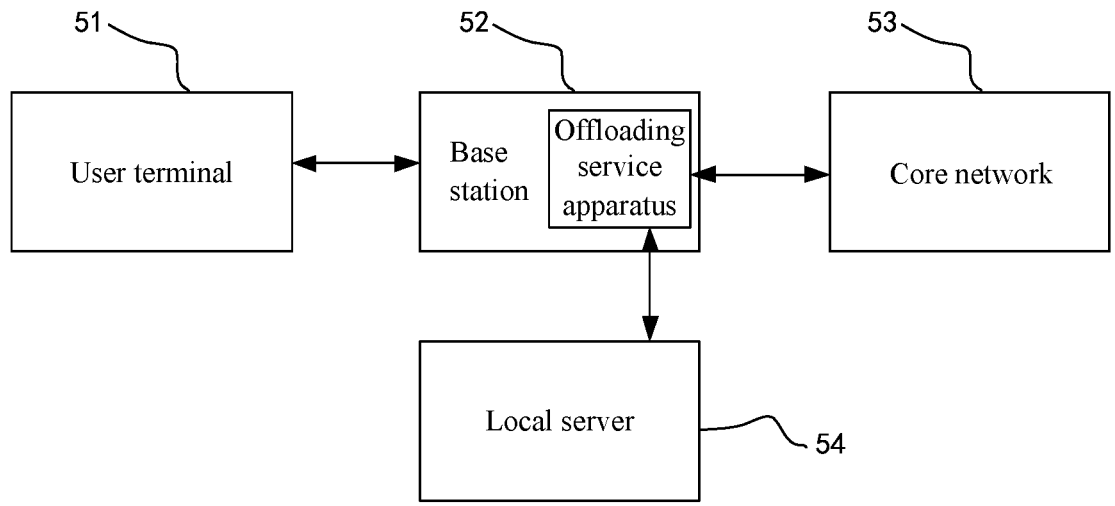
FIG. 5 is a schematic diagram of components of a local edge offloading system provided in Embodiment Three of the present disclosure.

The present embodiment further provides a local edge offloading system, and a structure of the local edge offloading system is shown in FIG. 5. The local edge offloading system includes: a user terminal 51, a local server 54, a core network 53, and a base station 52. The base station 52 establishes a corresponding user plane instance and an offloading user plane instance for the user terminal 51 which is connected to the base station 52. When an uplink data service package sent from the user terminal 51 is received, the offloading user plane instance determines whether there is a corresponding local offloading user plane instance for the uplink data service package. If there is a corresponding offloading user plane instance for the uplink data service package, the uplink data service package is matched with an offloading matching rule, and forwarding the uplink data service package to the core network 53 or the local server 54 is determined.

For the local edge offloading system shown in FIG. 5, an offloading service is deployed on hardware of the base station, and the offloading service interacts with a user plane of the base station. The offloading service operates in the offloading service apparatus, and the user plane operates on a user plane module. A forwarding path is established between a user plane service of the base station and the offloading service, and the path is used for reporting user plane bearer information and further forwarding a user plane package. When the user terminal accesses a wireless network and initiates a service, the user plane service of the base station forwards, classifies, and sends the uplink package of the user terminal to the offloading service. The offloading service performs classification processing on the package. A package accessing a local service is directly sent to the local server through a base station port, and a public network service package is sent to the core network.

Figure 6:
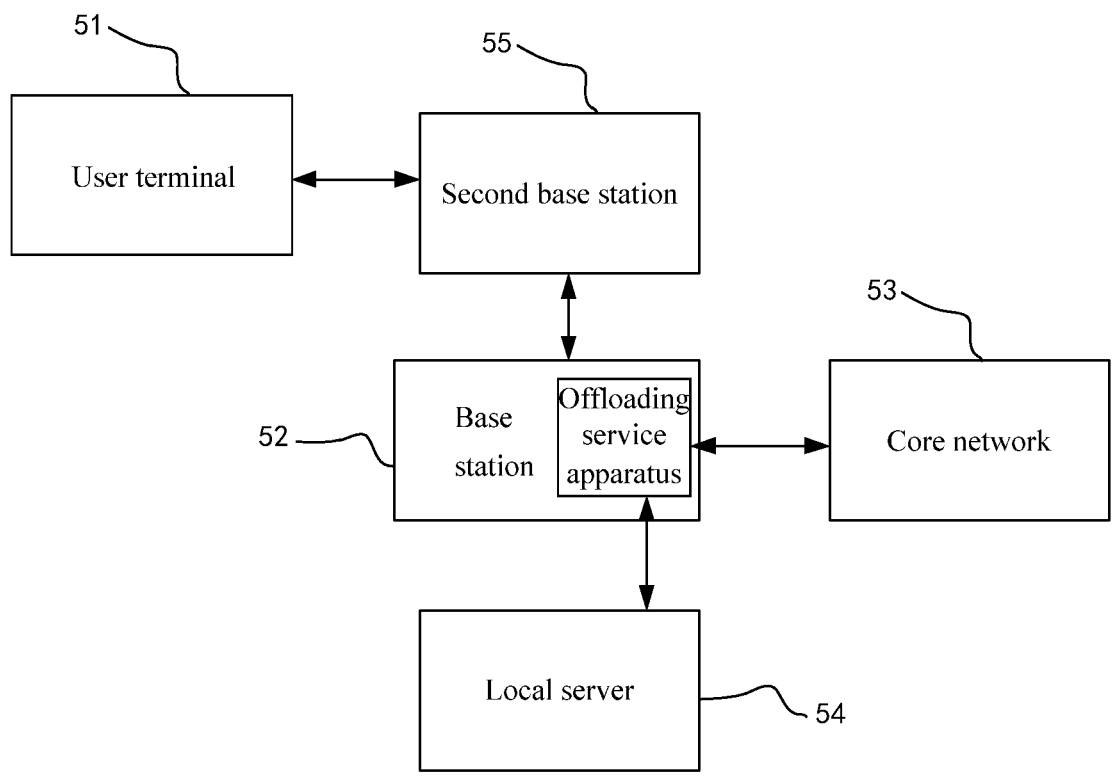
FIG. 6 is a schematic diagram of components of another local edge offloading system provided in Embodiment Three of the present disclosure.

In another embodiment, the local edge offloading system further includes a second base station 55, as shown in FIG. 6. An outer layer tunnel is encapsulated on a GTP-U package between the second base station 55 and the offloading service apparatus 43 of the base station 52, and the outer layer tunnel is a two-layer tunnel or a three-layer tunnel. When the user terminal 51 switches from the base station 51 to the second base station 55, the base station 52 generates a switching instruction and sends the switching instruction to the offloading service apparatus in the base station, and the offloading service apparatus marks a corresponding offloading user plane instance according to the switching instruction. A reverse transmission tunnel is established between the second base station 55 and the base station 52. The base station 52 sends source user plane bearer information of the user terminal 51 to the second base station 55. The second base station 55 establishes a second user plane instance, and sends second user plane bearer information to the offloading service apparatus. The offloading service apparatus switches and updates the corresponding offloading user plane instance.

The present embodiment provides an offloading service apparatus, a base station, and a local edge offloading system. The offloading service apparatus may be integrated with the base station, and may alternatively exist as a separate apparatus. In the local edge offloading system provided in the present embodiment, the offloading service apparatus is disposed in an existing network, and the base station is connected to the offloading service apparatus, an offloading user plane instance is established by the offloading service apparatus, and offloading matching is performed on an uplink data package service according to the offloading matching rule, such that local edge data service offloading is realized in some implementations, thereby reducing deployment costs and degree of difficulty, reducing a scope of influence, and achieving quick deployment of fulfilling a service.

Embodiment Four

For better understanding, the present embodiment provides proper supplementary description on the local edge offloading method provided in an embodiment of the present disclosure. It should be noted that, an offloading service in the present embodiment operates in an offloading service apparatus. The offloading service apparatus may be a specific hardware module, and may alternatively be a partial functional partition in a whole hardware apparatus. The offloading service apparatus in the present embodiment may be integrated with a base station, and may alternatively be separated from the base station.

Figure 7:
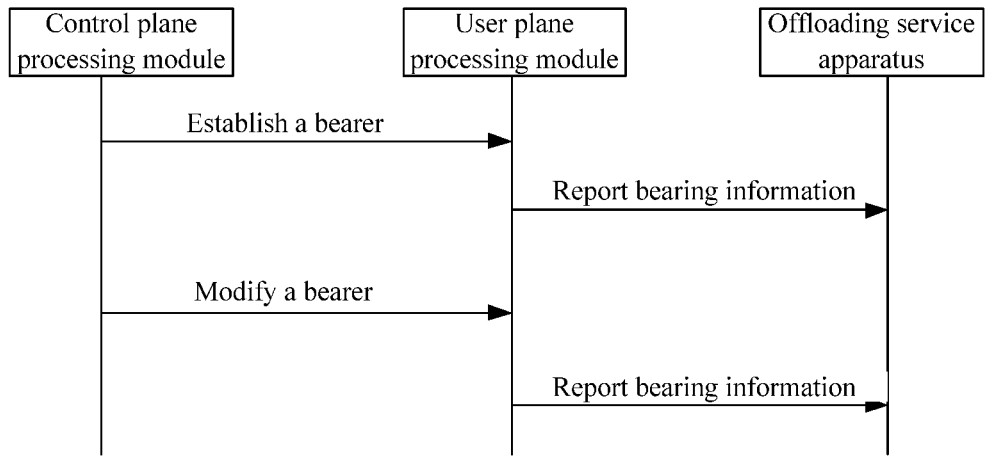
FIG. 7 is a flowchart of bearer information reporting in a local edge offloading method provided in Embodiment Four of the present disclosure.

A process of reporting bearer information may alternatively be referred to FIG. 7.

1. When a terminal user accesses a wireless network, during service processes such as establishing an uplink or downlink package, establishing a bearer, switching to the base station, and the like, it is necessary to notify a base station user plane to establish a user plane instance, and PLMN information, slice information, and the like are carried.
2. While the base station establishes the user plane instance by a user plane processing module, bearer information is notified to the offloading service apparatus through a GTP-U bearer of the user, and contents carried on the GTP-U bearer include at least tunnel information on a base station side, tunnel information of a user plane of a core network, and the PLMN information. A 5G base station may also carry slice information, Qos information, and the like. The offloading service apparatus establishes an offloading user instance according to reported information.
3. When user plane bearer information changes, for example, Qos related parameters changes, a control plane processing module notifies the user plane processing module to change the user plane bearer information, and the user plane processing module of the base station needs to report changed bearer information to the offloading service apparatus.
4. The offloading service apparatus looks up an offloading user instance according to reported bearer information and the tunnel information on the base station side. If the offloading user instance exists, the offloading user instance is updated; and if the offloading user instance does not exist, a new offloading user instance is established.

Figure 8:
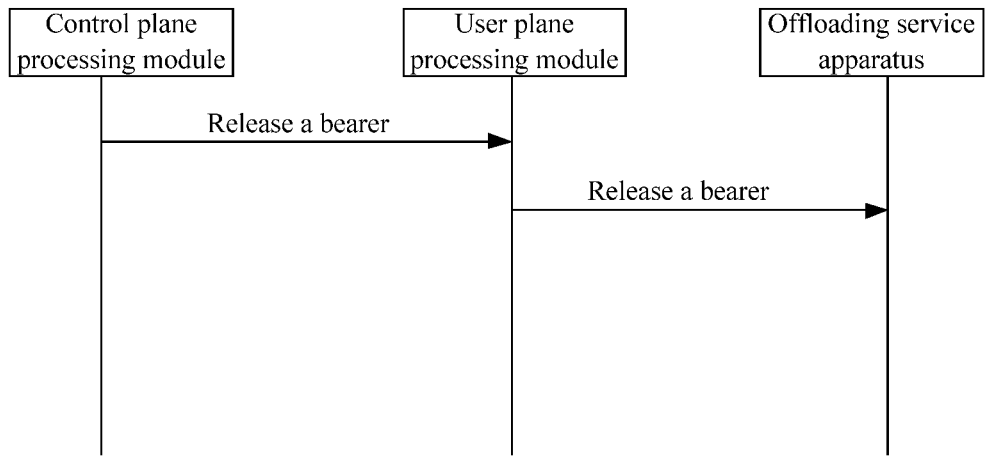
FIG. 8 is a flowchart of bearer information releasing in a local edge offloading method provided in Embodiment Four of the present disclosure.

A process of releasing bearer information of the base station may be referred to FIG. 8.

1. When the base station needs to release bearer information corresponding to a user terminal, for example, a message for releasing an uplink or downlink package, bearer information, or the like is required to notify the offloading service apparatus to release the bearer information.
2. When the offloading service apparatus receives the message, the offloading service apparatus needs to look up a corresponding offloading user instance according to tunnel information on a core network side carried on the GTP-U bearer, and delete the corresponding offloading user instance.

Figure 9:
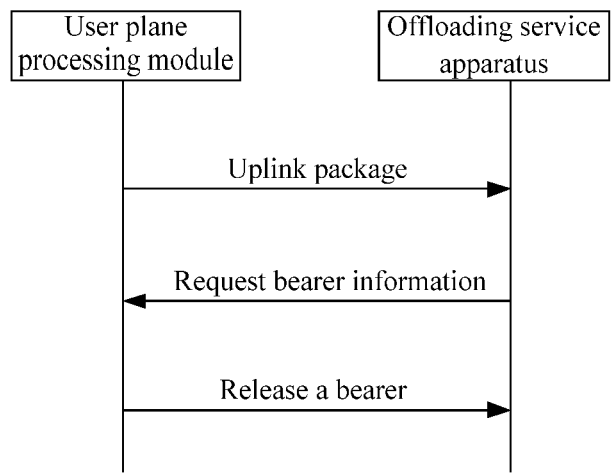
FIG. 9 is a flowchart illustrating an offloading service actively requests bearer information in a local edge offloading method provided in Embodiment Four of the present disclosure.

When the offloading service apparatus has received a user plane service package and cannot find out matched bearer information, in order to ensure normal proceeding of subsequent services, the offloading service apparatus needs to actively request bearer information, as shown in FIG. 9.

1. When the offloading service apparatus has received a user plane service package, the offloading service apparatus looks up an offloading user instance according to tunnel information in a user plane service package head. If the offloading user instance cannot be found, the offloading service apparatus initiates a bearer information request carrying the tunnel information in the package, to the user plane processing module of the base station.
2. When the user plane processing module of the base station has received the package, the user plane processing module looks up the user plane bearer information on the base station side according to carried tunnel information, and sends the user plane bearer information through a corresponding GTP-U tunnel to the offloading service apparatus according to a format for reporting the bearer information.
3. After the offloading service apparatus receives reported bearer information, the offloading service apparatus establishes a new offloading user instance.

Figure 10:
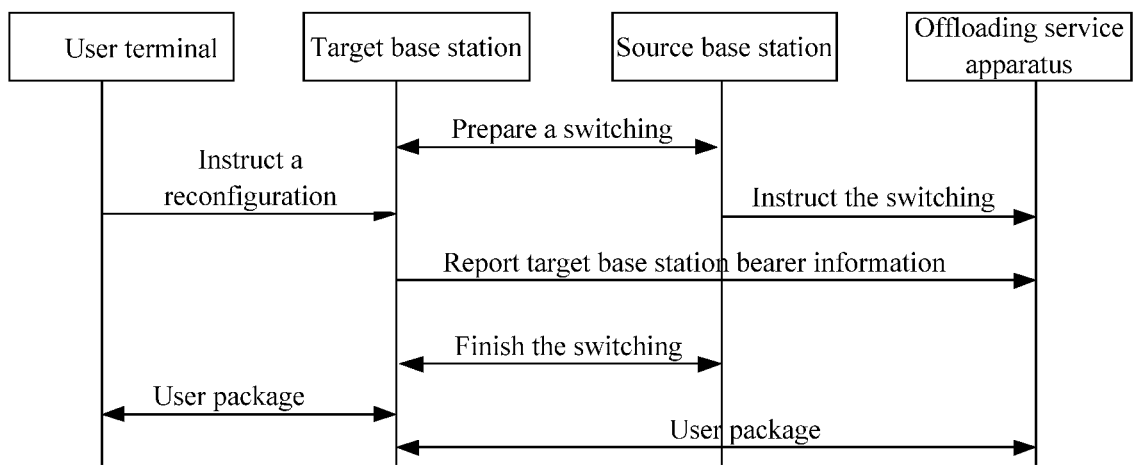
FIG. 10 is a flowchart of switching among multiple base stations in a local edge offloading method provided in Embodiment Four of the present disclosure.

In the present embodiment, when there are a plurality of base stations in a scope of a toB service and all user terminals in a coverage scope of these base stations need to access a service in the service scope, base stations in a certain scope may share a offloading service, and thus it is necessary to establish paths from other base stations to the offloading service. Since the plurality of base stations may be located in different transmission access networks and it is necessary to establish a tunnel between the base station and the offloading service apparatus, a three-layer tunnel solution, for example, a GRE, a IPSEC, and the like, may be adopted, or a two-layer tunnel, for example, a L2TP and a VxLAN, may alternatively be adopted. When the user terminal moves among multiple base stations and accesses a base station in a present area, if the continuity of the service is ensured, the offloading service needs to sense a switching process of a terminal as shown in FIG. 10.

1. When switching is triggered by movement of a user terminal, the local offloading service may not sense the switching in the base station; when it is determined that the user terminal switches between base stations from a source base station to a target base station, it is necessary to start switching preparation, and signaling interaction is performed between the source base station and the target base station to establish a reverse transmission tunnel.
2. When the source base station has established the reverse transmission tunnel and intends to shut down an air interface resource, it is necessary to notify the offloading service apparatus that a bearer of a user needs to switch. The source base station sends a switching instruction message to the offloading service apparatus on the GTP-U tunnel of the user, and the offloading service apparatus looks up a current user plane instance according to GTP-U tunnel information and marks that the user plane instance is about to switch.
3. After the target base station has established the reverse transmission tunnel and receives an air interface reconfiguration request, it is necessary to send bearer information established between the target base station and the core network to the offloading service apparatus. A structure and content of a message related to the bearer information established between the target base station and the core network are consistent with those of reported contents of the bearer information.
4. When the offloading service apparatus has received reporting bearer message of the target base station, the offloading service apparatus looks up the offloading user instance according to tunnel information on the core network side. If the offloading user instance is found and the user plane instance records an instance to switch, the tunnel information on the base station side of the offloading user instance is updated, and the PLMN information, the slice information, the Qos information, and the like also need be updated. The instance needs to inherit user terminal identification information.
5. A user package of the user terminal is sent to the target base station, and the target base station receives the package and forwards the package to the offloading service apparatus. The offloading service apparatus forwards the package to the local server in the local zone network or to the core network according to the offloading matching rule.

The local edge offloading method provided in the present embodiment has the advantages as follows. First, an offloading service on a base station is deployed on a base station, so that only a small amount of hardware processing resources are required, without new additional hardware and frame resources, and it is convenient to fulfill a service. Second, the offloading service supports processing of multiple offloading rules and forwarding of packages is independent from processing function of the base station, does not affect a user plane processing process of the base station, and thus does not affect the processing performance of the base station. Third, the offloading service supports access of multiple stations by only adding a service address for the service without other transmission resources, so that it is very convenient to establish a path from the station to the offloading service and it is convenient to fulfill a service. Fourth, the offloading service supports access of multiple stations, switching processes are taken full account, and the requirement of service continuity is met. Fifth, since the offloading service is directly deployed on the base station side and is not coupled to the core network, the local offloading service according to the present disclosure can support interfacing with a core network of other manufacturers.

Embodiment Five

Figure 11:
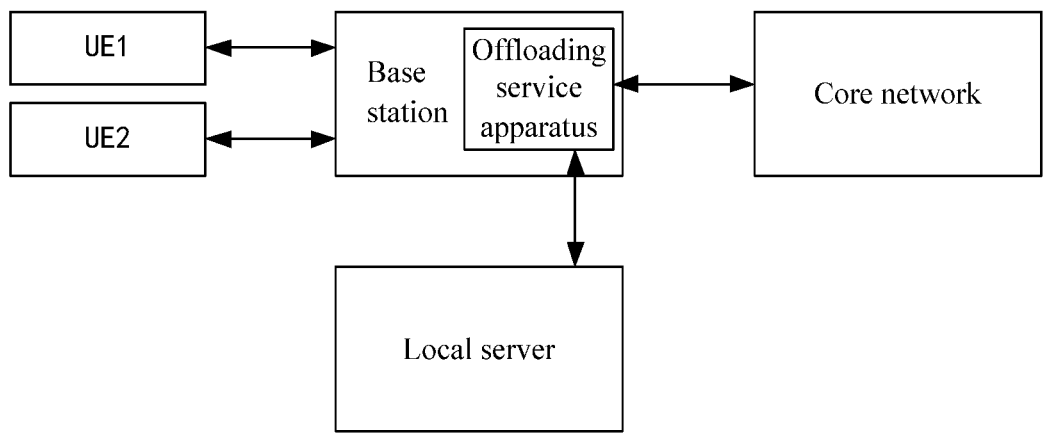
FIG. 11 is a schematic diagram of components of a local edge offloading system provided in Embodiment Five of the present disclosure.

The present embodiment provides a local edge offloading system, and a base station of the system performs managing by slice offloading. A structure of the system may be referred to FIG. 11, UE1 indicates a user terminal 1, and UE2 indicates a user terminal 2. The offloading service operates in an offloading service apparatus.
1. Subscription is performed between the UE1 and a slice ID1, and subscription is performed between the UE2 and a slice ID2.
2. An offloading configuration of the base station is used to perform offloading according to the slice ID1.
3. The UE1 accesses a wireless network and establishes context information, and a user plane of the base station establishes a bearer containing established information including tunnel information on a base station side (NBIP1, NBTEID1), tunnel information on a core network side (CNIP1, CNTEID1), attributive PLMN1 information, slice ID1 information, and QoS information. The slice ID1 meets a rule of the offloading configuration, and the user plane of the base station sends established bearer information to a base station offloading service through a GTP-U tunnel of the bearer.
4. The base station offloading service generates an offloading user instance according to the bearer information, and the offloading user instance has two primary keys: the tunnel information on the base station side (NBIP1, NBTEID1) and the tunnel information on the core network side (CNIP1, CNTEID1). The offloading user instance may be found according to the tunnel information on the base station side or the tunnel information on the core network side.
5. The UE2 accesses the wireless network and establishes context information, and the user plane of the base station establishes a bearer containing established information including tunnel information on a base station side (NBIP1, NBTEID2), tunnel information on a core network side (CNIP1, CNTEID2), attributive PLMN1 information, slice ID2 information, and QoS information.
6. Since the slice ID2 corresponding to the UE2 does not need offloading, there is no need to report bearer information to the base station offloading service.
7. When the UE1 initiates a data service and accesses a local server, the user plane of the base station sends an uplink user plane package to the base station offloading service after the tunnel encapsulation is performed on the uplink user plane package, and a format of an IP package after tunnel encapsulation is as follows.

| External IP head | Tunnel head | GTPU IP head | GTP-U head | Internal IP head | Payload |
|---|---|---|---|---|---|
| Source IP: NBIP1 Destination IP: offloading service IP | Filling according to type of selected tunnel | Source IP: NBIP1 Destination IP: CNIP1 | TEID: CNTEID1 | Source IP: UE1 IP Destination IP: local service IP | Contents of service package |

8. The base station offloading service receives the user plane package, peels off an outer layer tunnel and a GTP-U tunnel, looks up a corresponding offloading user instance according to GTP-U tunnel information of the package, and acquires the slice ID1 information. If an offloading rule of the slice ID1 configured is met, data is sent to a forwarding module of the offloading service, and an association relationship between data flow information and the tunnel is recorded. The package is sent to a local server via a corresponding local interface, and the package sent to the local server is as follows.

| Internal IP head | Payload |
|---|---|
| Source IP: UE1 IP<br>Destination IP: local service IP | Contents of service package |

9. For a downlink package sent from the local server to the UE1, the offloading service looks up a corresponding uplink service flow package according to a downlink service flow. If the uplink service flow package is found, tunnel information corresponding to the data flow is acquired, and the encapsulated package is sent to the user plane of the base station after reverse tunnel encapsulation is performed on the user package.

| External IP head | Tunnel head | GTPU IP head | GTP-U head | Internal IP head | Payload |
|---|---|---|---|---|---|
| Source IP: offloading service IP<br>Destination IP: NBIP1 | Filling according to type of selected tunnel | Source IP: CNIP1<br>Destination IP: NBIP1 | TEID: NBTEID1 | Source IP: local service IP<br>Destination IP: UE1 IP | Contents of a service package |

10. A process for subsequent user plane services is unchanged. Bi-directional communication for the UE1 to access the local server is normal.
11. When the UE2 initiates a data service and accesses the local server, if the user plane of the base station determines that a slice ID corresponding to the uplink package does not meet the offloading rule of base station, data is not sent to the local offloading service, and thus the UE2 cannot access the local server.
12. When the service of the UE1 is released, the user plane of the base station receives a bearer releasing message for notifying the offloading service to release the offloading user instance. The user plane of base station sends the tunnel information on the base station side (NBIP1, NBTEID2) and the tunnel information on the core network side (CNIP1, CNTEID2) carried on the GTP-U tunnel of the UE1 to the base station offloading service.

The base station offloading service looks up a corresponding offloading user instance according to the tunnel information on the base station side (NBIP1, NBTEID2) and the tunnel information on the core network side (CNIP1, CNTEID2) received and release the offloading user instance.

Embodiment Six

Figure 12:
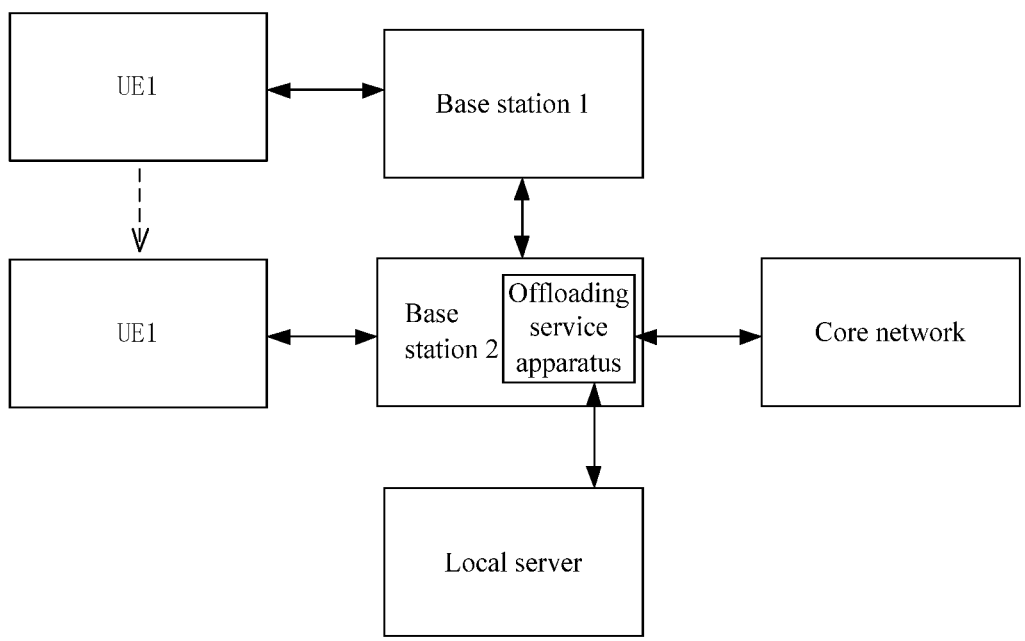
FIG. 12 is a schematic diagram of components of a local edge offloading system provided in Embodiment Six of the present disclosure.

When multiple base stations serve a toB service in the same one zone simultaneously, a user terminal UE1 needs to move among the multiple base stations, and it is necessary to consider the service continuity of local offloading of the base stations. At this time, the offloading service of one of the base stations is used as anchor offloading, and other base stations are required to forward a package to the anchor offloading service when they need the local offloading. A structure of such a system may be referred to FIG. 12.

1. Base station 1 and base station 2 serve the same one zone simultaneously. The UE1 may move between the base station 1 and the base station 2.
2. A base station offloading service is deployed on the base station 2. As an offloading anchor of two base stations, the offloading service on the base station 2 is configured with a destination IP offloading rule based on a local service.
3. It is necessary to establish a data passage between the base station 1 and the offloading service on the base station 2, and a tunnel is adopted. In this way, for a transmission network, addresses at two sides of the tunnel are respectively a service IP of the base station 1 (NBIP1) and a service IP of the offloading service.
4. When the UE1 accesses a wireless network and establishes context information, a user plane of the base station establishes a bearer containing established information including tunnel information on a base station side (NBIP1, NBTEID1), tunnel information on a core network side (CNIP1, CNTEID1), attributive PLMN1 information, slice ID1 information, and QoS information. The slice ID1 meets a rule of an offloading configuration, and a user plane of the base station 1 sends established bearer information through a GTP-U tunnel of a bearer, to an outer layer tunnel, and to the offloading service of the base station 2. A destination IP of the outer layer tunnel is an IP address of the offloading service of the base station 2.
5. The offloading service of the base station 2 receives reporting bearer message sent from the base station 1, performs tunnel de-encapsulation on the message, extracts package information, and establishes an offloading user instance corresponding to the UE1.
6. The UE1 initiates a data service, and accesses a local service. After an uplink package is processed by the user plane of the base station, the outer layer tunnel encapsulation is performed on the uplink package processed. The destination IP of the outer layer tunnel is the IP address of the offloading service of the base station 2. Then, the uplink package after outer layer tunnel encapsulation is sent to the offloading service of the base station 2.
7. The offloading service of the base station 2 receives the package, performs tunnel de-encapsulation on the package, and performs a matching according to a quintuple of an inner layer package and a corresponding offloading rule. If a destination IP offloading rule is matched, the package is forwarded to the local server by a package forwarding module. For a downlink package sent from the local service, a local offloading service performs a reverse matching according to a corresponding uplink flow, finds out tunnel information corresponding to the UE, performs tunnel encapsulation on the package, and sends the package after the tunnel encapsulation to the base station 1. The user plane of the base station performs normal package forwarding subsequently, and the service is unchanged.

8. At this time, the UE1 moves from a coverage area of the base station 1 to a coverage area of the base station 2, and the base stations and the UE determine to perform a switching. A switching process is initiated. A reverse transmission tunnel is established between the base station 1 and the target base station 2, and it is necessary to notify the base station offloading service that a bearer of a user needs to be switched when it is intended to shut down an air interface resource. A source station sends a switching instruction message on a GTP-U tunnel of the user to the offloading service, and the offloading service looks up a current user plane instance according to GTP-U tunnel information and marks that the user plane instance is about to initiate a switching.

9. When the target base station 2 has established a reverse transmission tunnel and receives an air interface reconfiguration request, the target base station 2 sends bearer information established between the target station and a core network to the offloading service. Established information of the bearer information includes tunnel information on a base station side (NBIP2, NBTEID2), tunnel information on a core network side (CNIP1, CNTEID1), attributive PLMN1 information, slice ID1 information, and QoS information.

10. The base station offloading service has received a reported message of the target station related to the bear information, and looks up an offloading user instance according to the tunnel information on the core network side. If a user plane instance is recorded as an instance that is intended to switch, the tunnel information on the base station side of the offloading user instance is updated to (NBIP2, NBTEID2), and the tunnel information on the core network side is unchanged. If the PLMN information, the slice information, and the QoS information change, updating is also needed, and the instance needs to inherit user terminal identification information.

11. After base station switching succeeds, a terminal user package is sent to the target station 2. The target station 2 receives the package and forwards the package to the offloading service, and the offloading service forwards the package to the local zone network. For a downlink package sent from a local network, the local offloading service receives the downlink package, finds out corresponding new tunnel information according to flow information, performs tunnel encapsulation on the downlink package, and sends the downlink package after the tunnel encapsulation to the target base station 2.

Through the above process, the continuity of uplink and downlink services of the UE1 can be ensured.

Embodiments of the present disclosure provide a local edge offloading method, a local edge offloading system, an offloading service apparatus, and a base station. The local edge offloading method includes: an offloading service receiving user plane bearer information sent from a base station, and establishing an offloading user plane instance according to the user plane bearer information; upon reception of an uplink data service package sent from the base station, the offloading service determining whether there is a corresponding offloading user plane instance for the uplink data service package; and if there is a corresponding offloading user plane instance for the uplink data service package, matching the uplink data service package with an offloading matching rule, and determining to forward the uplink data service package to a core network or a local server. By disposing an offloading service in an existing network, connecting the base station to the offloading service, establishing an offloading user plane instance with the offloading service, and performing offloading matching on an uplink data package service according to the offloading matching rule, local edge data service offloading is realized in some implementations, thereby reducing deployment costs and degree of difficulty, reducing a scope of influence, and achieving quick deployment of fulfilling a service.

As can be seen, those skilled in the art should understand that, all or some steps of the method and functional modules/units of a system and an apparatus disclosed above may be implemented as software (which may be realized by computer program codes executable by a computing device), firmware, hardware, and a proper combination thereof. In an embodiment of the hardware, a division of the functional modules/units mentioned in the above description does not necessarily correspond to a division of physical components. For example, one physical component may have multiple functions, or one function or step may be implemented by multiple physical components cooperatively. Some physical components or all physical components may be implemented as software executed by a processor, such as a central processor, a digital signal processor or a microprocessor, or may be implemented as hardware, or may be implemented as an integrated circuit, such as an application-specific integrated circuit.

In addition, it is known to a person of ordinary skills in the art that, communication media generally includes computer readable instructions, data structures, computer program modules or other data in a modulated data signal such as a carrier wave or other transport mechanism and includes any information delivery media. Thus, the present disclosure is not limited to any combination of specific hardware and software.

The above contents are further detailed description of embodiments of the present disclosure in conjunction with specific implementation manners, and it cannot be concluded that the specific implementation of the present disclosure is limited to the description only. For a person of ordinary skills in the technical field to which the present disclosure belongs, several simple deductions or replacements can be made without departing from the idea of the present disclosure, and these deductions or replacements shall all be considered as falling into the protection scope of the present disclosure.

The invention claimed is:

1. A local edge offloading method, comprising:
   receiving, by an offloading service, user plane bearer information sent from a base station, and establishing an offloading user plane instance according to the user plane bearer information;
   determining, by the offloading service, upon reception of an uplink data service package sent from the base station, whether there is an offloading user plane instance corresponding to the uplink data service package; and
   in a case where there is an offloading user plane instance corresponding to the uplink data service package, matching the uplink data service package with an offloading matching rule, and determining to forward the uplink data service package to a core network or a local server.

2. The local edge offloading method according to claim 1, wherein a GTP-U tunnel is used for data transmission between the offloading service and the base station as well as between the offloading service and the core network; and
in a case where the offloading service receives the user plane bearer information, the local edge offloading method further comprises: recording a correspondence relationship between a user terminal in the user plane bearer information and the GTP-U tunnel.

3. The local edge offloading method according to claim 2, wherein in a case where the offloading service has received a downlink data service package sent from the local server, the offloading service matches the downlink data service package with the offloading matching rule and determines whether to forward the downlink data service package to a corresponding base station.

4. The local edge offloading method according to claim 2, wherein establishing the offloading user plane instance according to the user plane bearer information comprises:
performing tunnel de-encapsulation on the user plane bearer information, and establishing the offloading user plane instance, wherein the offloading user plane instance has two primary keys comprising tunnel information on a base station side and tunnel information on a core network side.

5. The local edge offloading method according to claim 2, wherein matching the uplink data service package with the offloading matching rule and determining to forward the uplink data service package to the core network or the local server comprise:
forwarding the uplink data service package to the local server in a case where the uplink data service package is matched with the offloading matching rule, and forwarding the uplink data service package to the core network in a case where the uplink data service package is not matched with the offloading matching rule.

6. The local edge offloading method according to claim 2, wherein in a case where the offloading service has received new user plane bearer information, the offloading service queries whether there is a corresponding offloading user plane instance;
in a case where there is a corresponding offloading user plane instance, the offloading user plane instance is updated; and
in a case where there is no corresponding offloading user plane instance, a new offloading user plane instance is established.

7. The local edge offloading method according to claim 2, wherein in a case where the offloading service has received releasing bearer information, the offloading service looks up a corresponding offloading user plane instance and deletes the corresponding offloading user plane instance.

8. The local edge offloading method according to claim 2, wherein in a case where the offloading service finds out no corresponding offloading user plane instance according to the uplink data service package, the offloading service sends a bearer information request to a corresponding base station; and the offloading service receives user plane bearer information sent from the corresponding base station, and establishes a new offloading user plane instance.

9. The local edge offloading method according to claim 2, wherein in a case where the number of base stations to which the offloading service is connected is greater than or equal to two, an outer layer tunnel is encapsulated on a GTP-U package between the base station and the offloading service, and the outer layer tunnel is a two-layer tunnel or a three-layer tunnel.

10. The local edge offloading method according to claim 9, wherein in a case where the offloading service has received a switching instruction sent from the base station, the offloading service marks a corresponding offloading user plane instance according to the switching instruction, and the switching instruction is generated in a case where the user terminal switches between base stations; and
in a case where there is a switching mark on the offloading user plane instance corresponding to the user plane bearer information, the offloading user plane instance is updated.

11. The local edge offloading method according to claim 1, wherein the offloading matching rule comprises at least one matching rule from: quintuplet offloading, slice offloading, PLMN offloading, and domain name offloading; and
wherein the user plane bearer information comprises at least one from: tunnel information on a base station side, tunnel information of a user plane of the core network, PLMN information, slice information, and Qos information.

12. A local edge offloading method, comprising:
establishing, by a base station, a user plane instance for a user terminal which accesses the base station, and sending user plane bearer information of the user plane instance to an offloading service, the user plane bearer information being used for establishing an offloading user plane instance by the offloading service; and
generating, by the base station, upon reception of an uplink data service sent from the user terminal, an uplink data service package and sending the uplink data service package to the offloading service, and determining, by the offloading service, to forward the uplink data service package to a core network or a local server according to an offloading matching rule.

13. The local edge offloading method according to claim 12, wherein a GTP-U tunnel is used for data transmission between the base station and the offloading service.

14. The local edge offloading method according to claim 13, wherein in a case where the base station has received a downlink data service package sent from the offloading service, the base station sends the downlink data service package to a corresponding user terminal.

15. The local edge offloading method according to claim 13, wherein in a case where user plane bearer information changes, changed user plane bear information is sent to the offloading service.

16. The local edge offloading method according to claim 13, wherein in a case where the user plane instance is deleted, releasing bearer information is sent to the offloading service.

17. The local edge offloading method according to claim 13, wherein in a case where a bearer information request sent from the offloading service is received, corresponding user plane bearer information is looked up and sent to the offloading service.

18. The local edge offloading method according to claim 13, wherein in a case where the number of base stations is greater than or equal to two, an outer layer tunnel is encapsulated on a GTP-U package between the base station and the offloading service, and the outer layer tunnel is a two-layer tunnel or a three-layer tunnel.

19. The local edge offloading method according to claim 18, wherein in a case where the base station which the user terminal accesses is switched from a source base station to a target base station, the source base station generates a switching instruction and sends the switching instruction to the offloading service; and a reverse transmission tunnel is established between the source base station and the target base station; and the source base station sends source user plane bearer information of the user terminal to the target base station, and the target base station establishes a destination user plane instance and sends destination user plane bearer information to the offloading service, the destination user plane bearer information is used by the offloading service to switch and update a corresponding offloading user plane instance.

20. A local edge offloading system, comprising: a user terminal, a local server, a core network, and the base station, wherein the base station comprises an offloading service apparatus;

the base station is configured: to establish a user plane instance for a user terminal, and to send user plane bearer information to the offloading service apparatus;

the offloading service apparatus is configured: to establish an offloading user plane instance according to the user plane bearer information, and to record a correspondence relationship between the user terminal in the user plane bearer information and a GTP-U tunnel; to perform tunnel de-encapsulation in a case where an uplink data package is received, and to perform tunnel encapsulation in a case where a downlink data package is received; to receive an uplink data service package sent from the base station, to determine whether there is a corresponding offloading user plane instance in the uplink data service package, and to match the uplink data service package to an offloading matching rule in a case where there is a corresponding offloading user plane instance in the uplink data service package and to determine to forward the uplink data service package to a core network or a local server, to match the downlink data service package with the offloading matching rule, and to determine whether to forward the downlink data service package to the corresponding base station; to forward the uplink data service package to the local server or the core network, and to receive a downlink data service package sent from the local server, wherein the local edge offloading system further comprises: a second base station, wherein an outer layer tunnel is encapsulated on a GTP-U package between the second base station and the offloading service apparatus of the base station, the outer layer tunnel is a two-layer tunnel or a three-layer tunnel; in a case where the user terminal switches from the base station to the second base station, the base station generates a switching instruction and sends the switching instruction to the offloading service apparatus in the base station, and the offloading service apparatus marks a corresponding offloading user plane instance according to the switching instruction; and a reverse transmission tunnel is established between the second base station and the base station; the base station sends source user plane bearer information of the user terminal to the second base station; the second base station establishes a second user plane instance, and sends second user plane bearer information to the offloading service apparatus; and the offloading service apparatus switches and updates a corresponding offloading user plane instance.

\* \* \* \* \*